United States Patent
Kaupp

(10) Patent No.: US 9,404,691 B2
(45) Date of Patent: Aug. 2, 2016

(54) CONDENSING HEAT RECOVERY UNIT FOR A PORTABLE FLUID HEATER

(71) Applicant: Cale Patrick Collins Kaupp, Medicine Hat (CA)

(72) Inventor: Cale Patrick Collins Kaupp, Medicine Hat (CA)

( * ) Notice: Subject to any disclaimer, the term of this patent is extended or adjusted under 35 U.S.C. 154(b) by 221 days.

(21) Appl. No.: 13/950,097

(22) Filed: Jul. 24, 2013

(65) Prior Publication Data

US 2015/0027667 A1  Jan. 29, 2015

(51) Int. Cl.

| | |
|---|---|
| F28D 21/00 | (2006.01) |
| F24H 8/00 | (2006.01) |
| F24H 1/06 | (2006.01) |
| F28F 3/12 | (2006.01) |
| F28D 1/03 | (2006.01) |
| F28D 9/00 | (2006.01) |
| F28F 3/04 | (2006.01) |
| F28F 21/08 | (2006.01) |

(52) U.S. Cl.
CPC .............. *F28D 21/0007* (2013.01); *F24H 1/06* (2013.01); *F24H 8/00* (2013.01); *F28D 1/0391* (2013.01); *F28D 9/0081* (2013.01); *F28F 3/12* (2013.01); *F24D 2200/18* (2013.01); *F28F 3/048* (2013.01); *F28F 21/084* (2013.01); *F28F 2275/06* (2013.01); *Y02B 30/102* (2013.01)

(58) Field of Classification Search
CPC .......... F23L 15/045; F24H 8/00; F24H 8/003; F24H 8/006; F24H 9/0026; F24H 9/0036; F24H 1/36; F24H 1/38; F24H 1/40; F24H 1/06; Y02B 30/102; Y02B 30/106; F28F 3/04; F28F 3/048; F28F 3/12; F28F 3/08; F28F 1/02; F28F 1/045; F28F 1/04; F28D 2001/026; F28D 1/053; F28D 1/05358; F28D 1/05366; F28D 21/007
USPC .................................................. 165/130, 173
See application file for complete search history.

(56) References Cited

U.S. PATENT DOCUMENTS

| | | | | |
|---|---|---|---|---|
| 2,343,387 | A | * | 3/1944 | Sargent et al. ................. 165/130 |
| 4,337,826 | A | * | 7/1982 | Kritzer ........................... 165/151 |
| 4,342,359 | A | | 8/1982 | Baker |
| 4,558,689 | A | | 12/1985 | McCann |
| 5,510,087 | A | | 4/1996 | Johnson et al. |
| 6,173,493 | B1 | * | 1/2001 | Dierbeck .................. 29/890.043 |
| 6,357,396 | B1 | | 3/2002 | Stansfield et al. |
| 7,458,340 | B2 | * | 12/2008 | Takeda et al. ................. 122/31.1 |
| 8,099,959 | B2 | | 1/2012 | Takeuchi et al. |
| 2001/0040025 | A1 | * | 11/2001 | Jurisich .......................... 165/148 |
| 2007/0289559 | A1 | * | 12/2007 | Amada ......................... 122/19.2 |
| 2008/0251034 | A1 | * | 10/2008 | Ye et al. ........................ 122/18.1 |

(Continued)

FOREIGN PATENT DOCUMENTS

| | | | | |
|---|---|---|---|---|
| DE | WO 2007137863 | A1 * | 12/2007 | ......... F02M 25/0714 |
| EP | 1698839 | A2 * | 9/2006 | |

(Continued)

*Primary Examiner* — Tho V Duong
(74) *Attorney, Agent, or Firm* — Nelson Mullins Riley & Scarborough, LLP

(57) ABSTRACT

A condensing heat recovery unit for a portable fluid heater has a heat exchanger with a plurality of hollow rectangular heat recovery panels, a flue gas collection hood that funnels flue gas from the portable fluid heater into one side of the heat exchanger, and a condensate collector connected to the opposite side of the heat exchanger that collects flue gas condensate.

17 Claims, 12 Drawing Sheets

(56) References Cited

U.S. PATENT DOCUMENTS

2009/0235875 A1* 9/2009 Gordon et al. ............. 122/13.01
2009/0288813 A1* 11/2009 Park .............................. 165/169

FOREIGN PATENT DOCUMENTS

| JP | 56040086 A | * | 4/1981 |
| WO | 2011064570 A2 | | 6/2011 |

* cited by examiner

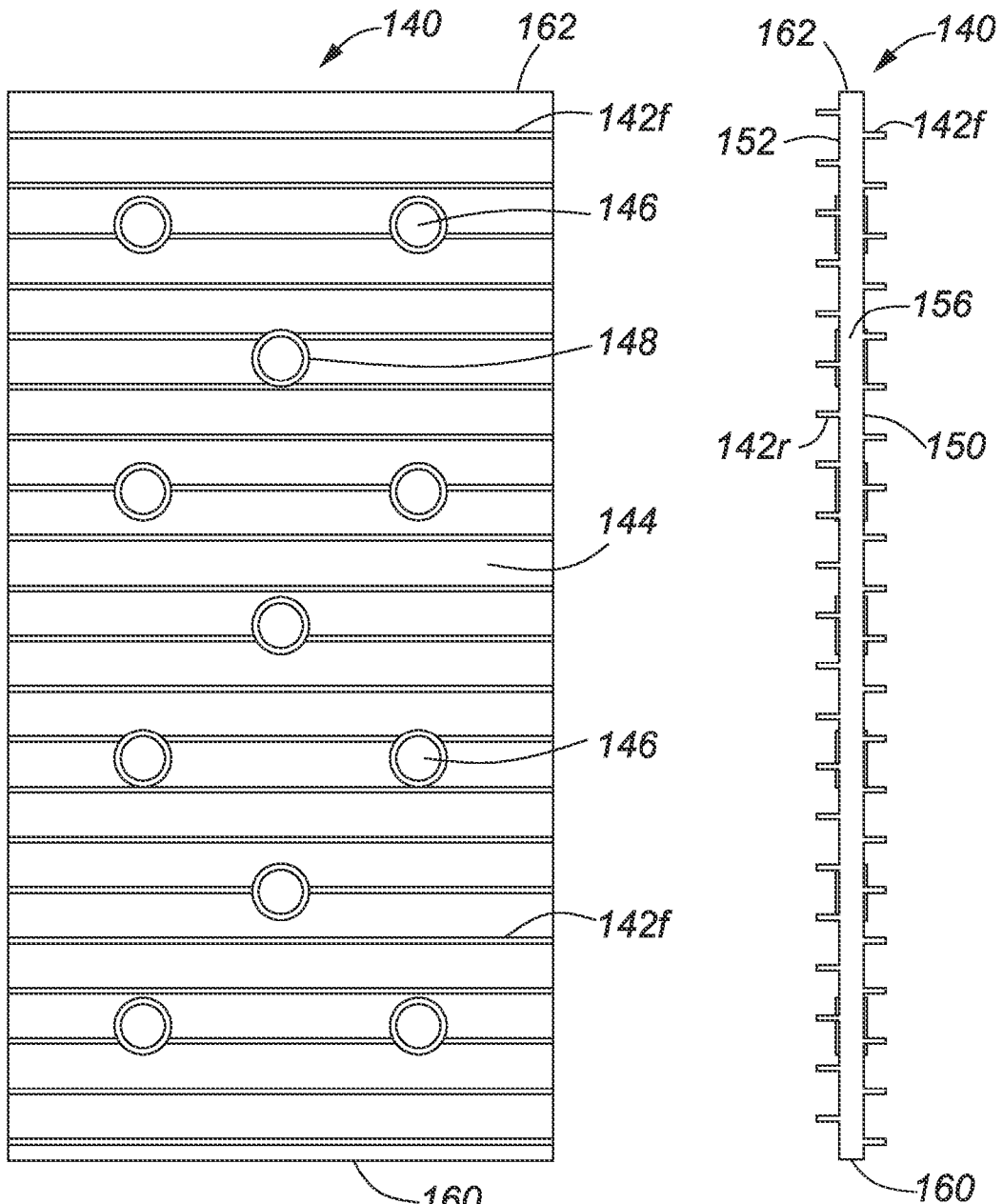

US 9,404,691 B2

CONDENSING HEAT RECOVERY UNIT FOR A PORTABLE FLUID HEATER

FIELD OF THE INVENTION

This invention relates in general to portable fluid heaters and, in particular, to a condensing heat recovery unit for such heaters.

BACKGROUND OF THE INVENTION

Portable fluid heaters for rapidly heating large volumes of water or other fluids are required for certain applications. Such applications include the heating of hydrocarbon well fracturing fluids, which are generally aqueous fluids that are typically heated to about 15° C.-50° C. and mixed with proppants and surfactants before being injected into a hydrocarbon well. Portable heaters for this application must be lightweight, rugged, efficient and capable of high heat output.

FIG. 1 is a schematic side elevational view of an exemplary portable fluid heater 20. The portable fluid heater 20 combusts fuel supplied from fuel tanks 22, 24 to heat cold fluid pumped in through inlet 26. The cold fluid is circulated through a fluid path within the portable fluid heater 20 and adsorbs heat from the fuel consumed. The heated fluid exits through a fluid outlet 28 and is stored in a holding tank (not shown) or is piped directly to a blender (not shown) where the proppants and/or other additives are mixed with the heated fluid before it is injected into a well.

Many configurations for portable fluid heaters are known, but almost all of them discharge large volumes of hot flue gas 30 into the atmosphere. Regardless of how efficiently portable heaters combust fuel, sensible and latent heat in the flue gas is not utilized. There therefore exists a need for a condensing heat recovery unit for portable fluid heaters to utilize at least a part of that wasted heat.

SUMMARY OF THE INVENTION

It is therefore an object of the invention to provide a condensing heat recovery unit for portable fluid heaters.

The invention therefore provides a condensing heat recovery unit for a portable fluid heater, including: a heat exchanger having an inlet manifold with an inlet port; an outlet manifold with an outlet port; and a plurality of rectangular heat recovery panels arranged in a side-to-side juxtaposition with open top ends respectively connected to the outlet manifold and open bottom ends respectively connected to the inlet manifold; a flue gas collection hood that directs flue gas exhausted from the portable fluid heater into a first side of the heat exchanger; and a condensate collector on an opposite side of the heat exchanger that funnels flue gas condensate to a condensate drain.

The invention further provides a condensing heat recovery unit for a portable fluid heater, including: a heat exchanger having an inlet manifold with a fluid inlet port; an outlet manifold with a fluid outlet port; and a plurality of hollow rectangular heat recovery panels respectively having opposed side walls, opposed edge walls and open top and bottom ends, the respective heat recovery panels being arranged in a spaced-apart side-to-side juxtaposition with the open top ends respectively connected to the outlet manifold and the open bottom ends respectively connected to the inlet manifold; a flue gas collection hood that traps flue gas exhausted from the portable fluid heater and directs the flue gas into a first side of the heat exchanger; and a condensate collector connected to an opposite side of the heat exchanger that collects flue gas condensate expelled from the heat exchanger and funnels the condensate to a condensate drain.

The invention yet further provides a condensing heat recovery unit for a portable fluid heater, including: a heat exchanger with an inlet manifold having a fluid inlet port on one end; an outlet manifold having a fluid outlet port on an end opposite that of the inlet port; and a plurality of hollow rectangular heat recovery panels respectively having opposed side walls, opposed edge walls and open top and bottom ends, the respective heat recovery panels being arranged in a spaced-apart side-to-side juxtaposition with the open top ends respectively connected to the outlet manifold and the open bottom ends respectively connected to the inlet manifold; a flue gas collection hood that funnels flue gas exhausted from the portable fluid heater into a flue gas intake side of the heat exchanger; and a condensate collector connected to a flue gas outlet side of the heat exchanger to collect flue gas condensate expelled from the heat exchanger and funnel the condensate to a condensate drain.

BRIEF DESCRIPTION OF THE DRAWINGS

Having thus generally described the nature of the invention, reference will now be made to the accompanying drawings, in which:

FIG. 6 is a side elevational view of the heat recovery panel shown in FIG. 5;

FIG. 7 is an edge view of the heat recovery panel shown in FIG. 5;

FIG. 8 is a top plan view of the heat recovery panel shown in FIG. 5;

DETAILED DESCRIPTION OF THE PREFERRED EMBODIMENTS

The invention provides a condensing heat recovery unit for a portable fluid heater. The condensing heat recovery unit preheats fluid that is to be heated by the portable fluid heater by recovering sensible and latent heat from flue gas exhausted from the portable fluid heater. Measurements have shown that a minimum improvement of 17% in efficiency of heat recovered from the fuel consumed by the portable fluid heater is realized using the condensing heat recovery unit.

Figure 1:
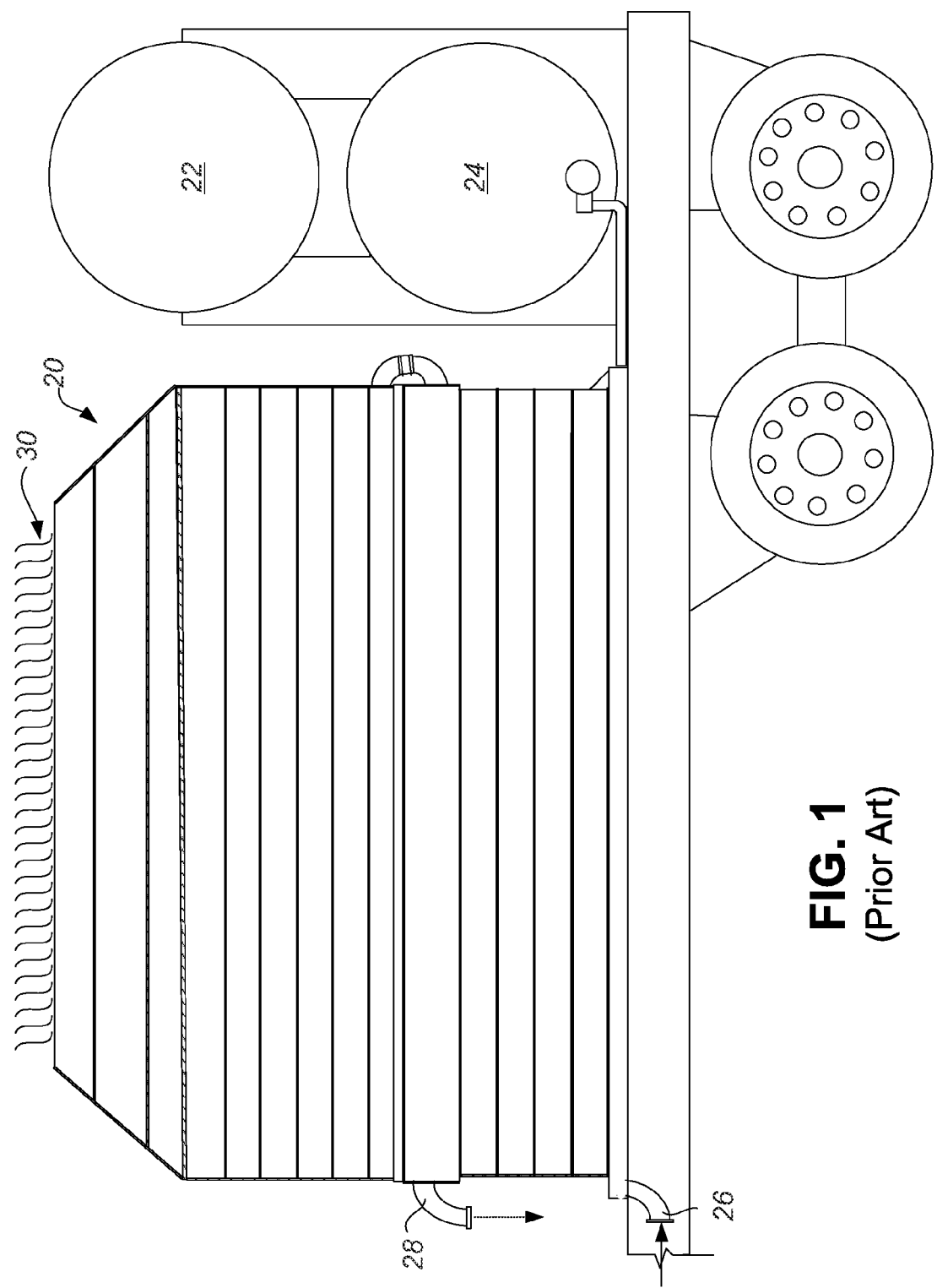
FIG. 1 is a schematic side elevational view of an embodiment of a prior art portable fluid heater used to heat frac fluid before it is injected into a well bore.
Figure 2:
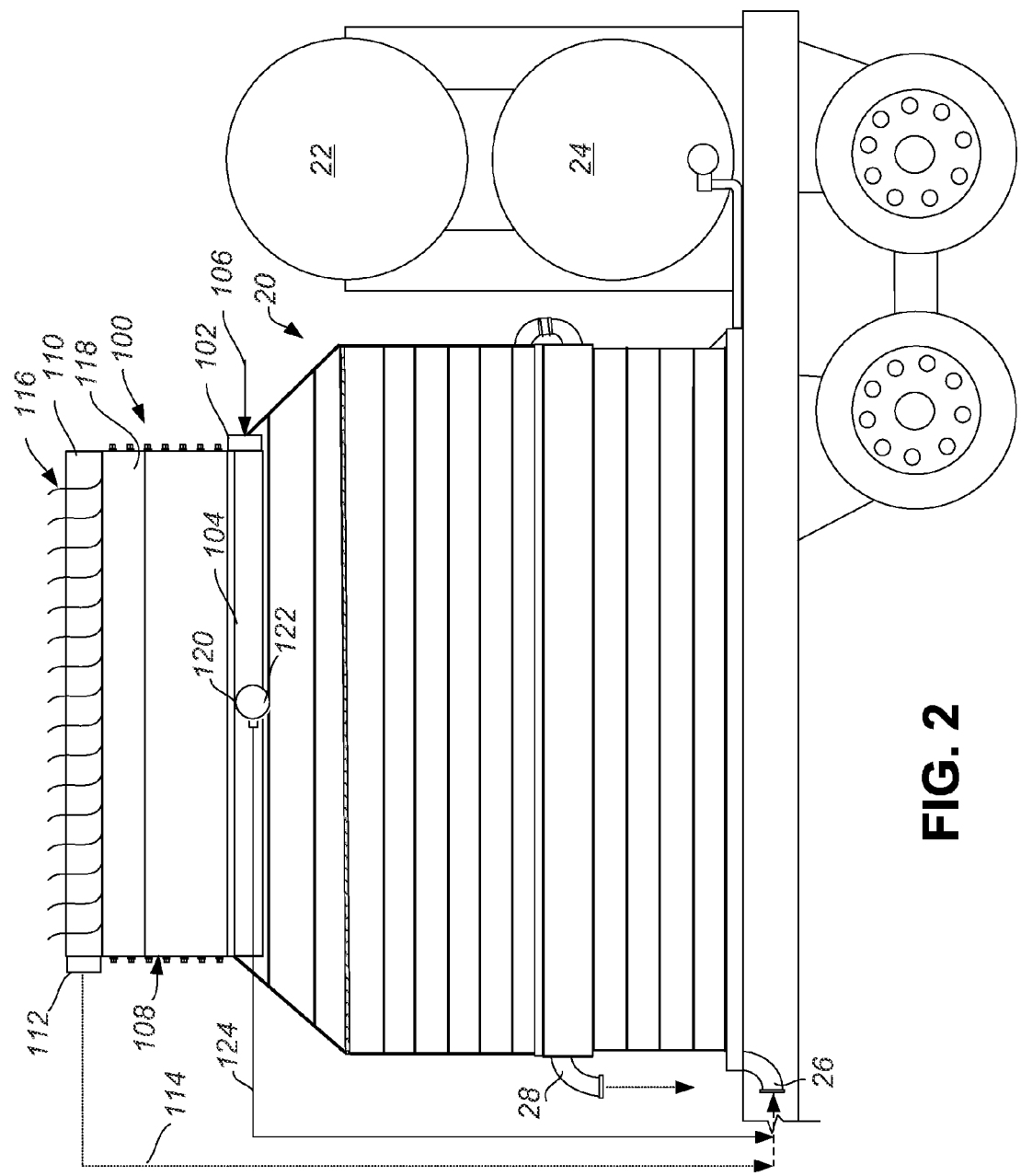
FIG. 2 is a schematic side elevational view of the portable fluid heater shown in FIG. 1 equipped with a condensing heat recovery unit in accordance with the invention.

FIG. 2 is a schematic side elevational view of one embodiment of a condensing heat recovery unit 100 mounted on the portable fluid heater 20 shown in FIG. 1. The condensing heat recovery unit 100 has an intake port 102 connected to an intake manifold 104. A cold fluid conduit (not shown) is connected to the intake port 102 to supply cold fluid 106 to the intake manifold 104. The cold fluid 106 flows through a heat exchanger 108 of the heat recovery unit 100, which will be explained in detail below with reference to FIGS. 5-16. The cold fluid 106 is heated by hot flue gas 30 (see FIG. 1) exhausted from the portable fluid heater 20 as it passes through the heat exchanger 108. The heated fluid enters an outlet manifold 110 and flows out of the heat recovery unit 100 through an outlet port 112. A fluid conduit (not shown) connected to the outlet port 112 channels the heated fluid 114 to the inlet 26 of the fluid heater 20. Cooled flue gas 116 that has passed through and been cooled by the heat exchanger 108 is exhausted from a top of a condensate collector 118. The condensate collector 118 collects water vapor condensed from the hot flue gas 30 as latent heat is extracted from the hot flue gas 30, as will be explained below with reference to FIG. 3. The collected condensate drains through a condensate drain 120. In one embodiment of the invention, a high pressure fluid pump 122 that is controlled by a float (not shown) in the condensate collector 118, as one example of a pump control mechanism, pumps collected condensate 124 to the inlet 26 of the portable fluid heater 20 via a fluid conduit (not shown). In another embodiment, the condensate 124 is pumped into a high pressure line connected to the fluid outlet 28 and mingles with the fluid heated by the portable fluid heater 20.

Figure 3:
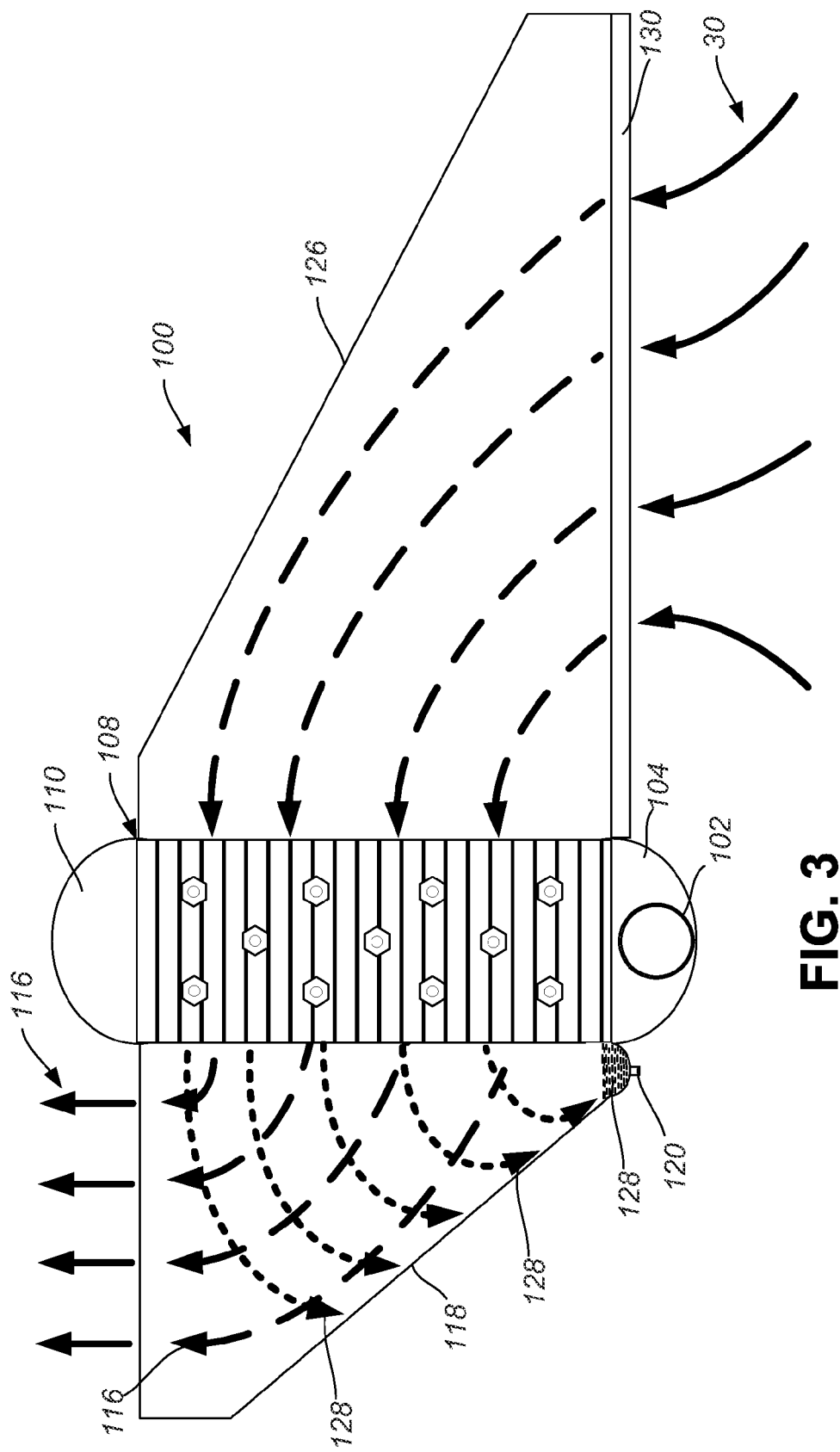
FIG. 3 is a schematic intake side view of the heat recovery unit shown in FIG. 2.

FIG. 3 is a schematic intake side view of the heat recovery unit 100 shown in FIG. 2. An exhaust intake hood 126 captures hot flue gas 30 exhausted from the portable fluid heater 20 (see FIG. 2) and directs it into the heat exchanger 108. The size and shape of the exhaust intake hood 126 are dependent on the size and shape of an exhaust vent of the portable fluid heater 20. The exhaust intake hood 126 should completely cover the exhaust vent and capture all hot flue gas 30 exhausted by the portable fluid heater 20. In one embodiment, a flexible gasket 130 along a bottom edge of the exhaust intake hood 126 forms a seal with a top of the portable fluid heater 20 to ensure that hot flue gas is funneled through the heat exchanger 108.

The hot flue gas 30 passes through channels in the heat exchanger 108, as will be explained with reference to FIGS. 9 and 16. As it passes through the heat exchanger, which is constantly cooled by the flow of fluid to be heated that is pumped through the inlet port 102, the hot flue gas 30 gives up sensible and latent heat to the heat exchanger 108. The latent heat is recovered as combustion water vapor in the hot flue gas 30 condenses within the channels of the heat exchanger 108, the condensate 128 is blown out of the heat exchanger 108 by the cooled exhaust gas 116 and collects in a bottom of the condensate collector 118, where it is pumped away through the condensate drain 120, as explained above with reference to FIG. 2.

Figure 4:
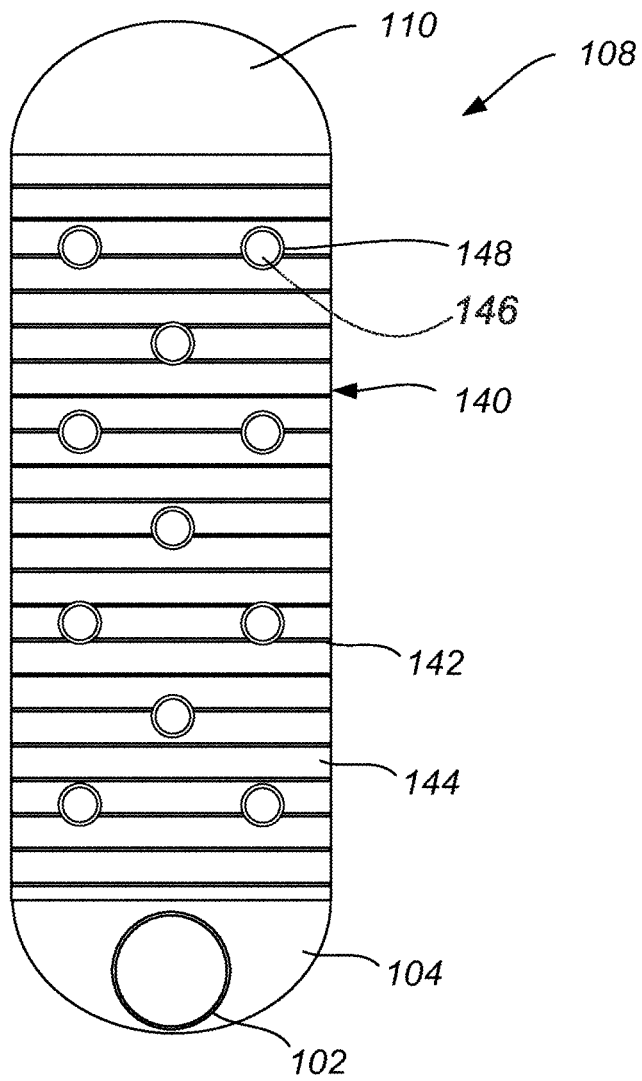
FIG. 4 is a schematic intake side view of a heat exchanger of the heat recovery unit shown in FIGS. 2 and 3.

FIG. 4 is a schematic intake side view of a heat exchanger 108 of the heat recovery unit 100 shown in FIGS. 2 and 3. As will be seen in FIG. 9, the heat exchanger 108 is assembled using a plurality of hollow rectangular heat recovery panels 140. In one embodiment, the respective heat recovery panels are fabricated from aluminum alloy plate; are identical in size and shape and each panel is about twice as long as it is wide. As will be seen in FIGS. 5 and 7, the opposite sides of each panel 140 have parallel ribs 142 that are perpendicular to side surfaces 144 of the respective panels 140. Each panel 140 also has a plurality of circular apertures 146. The circular apertures 146 are formed by drilling holes though each panel 140 in a predetermined pattern. A tubular segment 148 (see also FIG. 5) is then inserted in each bore and welded to each side surface 144 of the panel 140 to ensure a high-pressure fluid-tight seal. The respective apertures 146 accept through bolts (see FIGS. 2, 3 and 9) which reinforce the heat exchanger 108 to permit the heat exchanger 108 to contain fluid pressures of up to about 4,000 psi (about 27.5 mPa), which are at times present in frac fluid supply lines.

Figure 5:
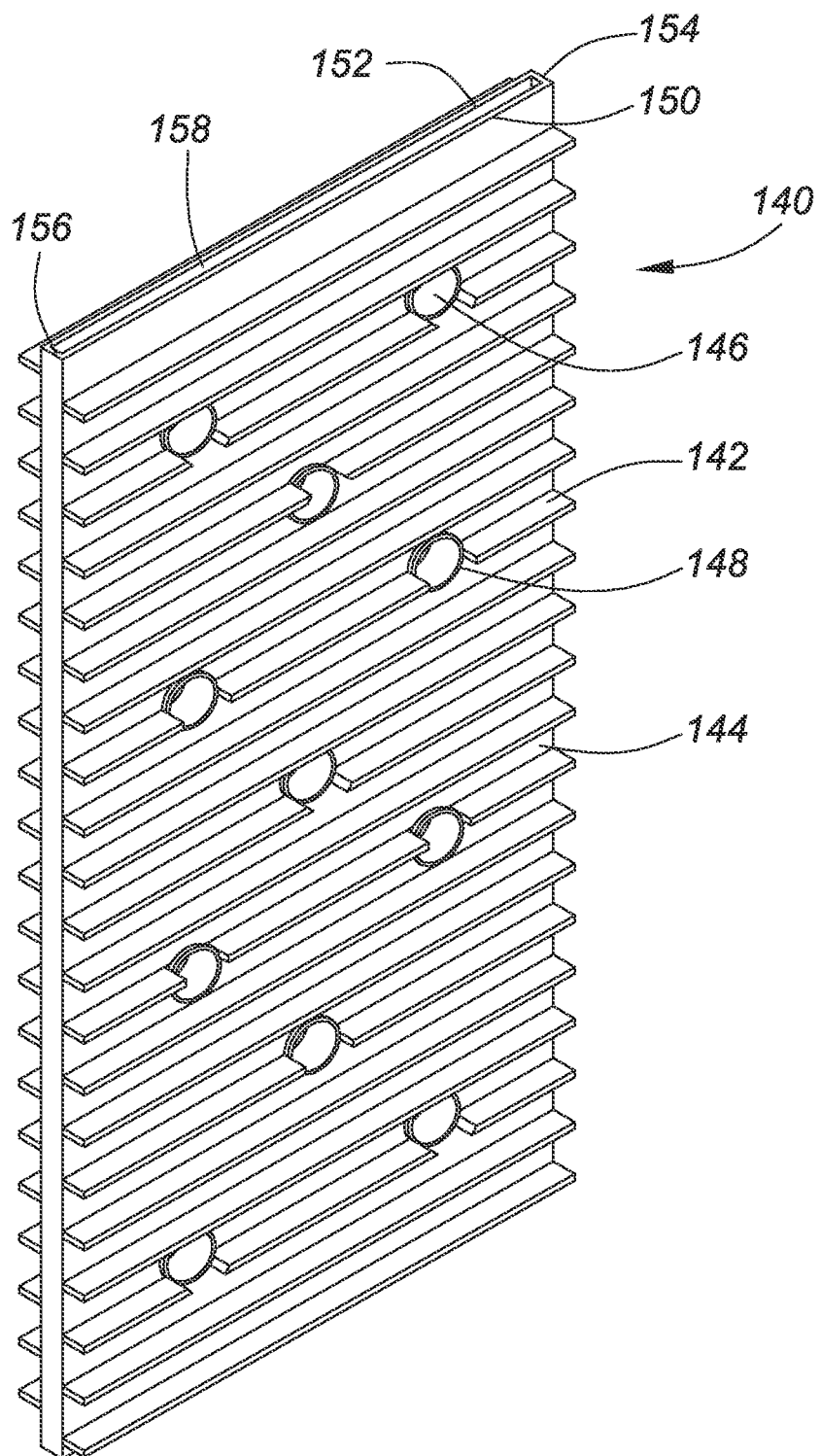
FIG. 5 is an isometric view of a heat recovery panel of the heat exchanger shown in FIG. 4.

FIG. 5 is an isometric view of a heat recovery panel 140 of the heat exchanger 108 shown in FIG. 4. As can be seen, each panel 140 has opposed side walls 150 and 152, opposed edge walls 154 and 156, and open top and bottom ends, and is constructed from four rectangular plates. The opposed side walls 150 and 152 are constructed from plates that have a ribbed outer surface and a flat inner surface, while the opposed edge walls 154 and 156 are constructed from plates that are flat on both sides. The four rectangular plates are referred to, for convenience only, as: ribbed front plate 150, ribbed rear plate 152, and flat edge plates 154 and 156. The four plates 150, 152, 154 and 156 collectively define a hollow rectangular channel 158 through which fluid flows from the intake manifold 102 to the outlet manifold 110. The heat recovery panel 140 can be constructed in any convenient way. For example, the heat recovery panel 140 may be constructed by welding together the four plates. As can also be seen, in this embodiment the tubular segments 148 extend through the front plate 150 and the rear plate 152, but only to an extent that makes welding convenient. This permits the ribs 142, which on the front plate 150 are alternate with respect to those on the rear plate 152 as seen in FIG. 7 (ribs 142$f$ and 142$r$ respectively), to be interleaved when the respective heat recovery panels 140 are assembled into the heat exchanger 108, as shown in FIG. 9. The ribs 142$f$ and 142$r$ support the respective heat recovery panels in a spaced-apart juxtaposition, as will be explained below with reference to FIG. 9.

FIG. 6 is a front side elevational view of the heat recovery panel shown in FIG. 5. The heat recovery panel 140 has a bottom end 160 connected to the intake manifold 104 and a top end 162 connected to the outlet manifold 110.

FIG. 7 is an edge view of the heat recovery panel 140 shown in FIG. 5, showing edge plate 156. As explained above, the ribs 142$f$ on the front plate 150 are alternate with respect to the ribs 142$r$ on the rear plate 152.

FIG. 8 is a top plan view of the heat recovery panel 140 shown in FIG. 5. As explained above, the tubular segments 148 extend through the hollow channel 158 to provide a path for reinforcing rods, as will be explained below with reference to FIG. 9.

Figure 9:
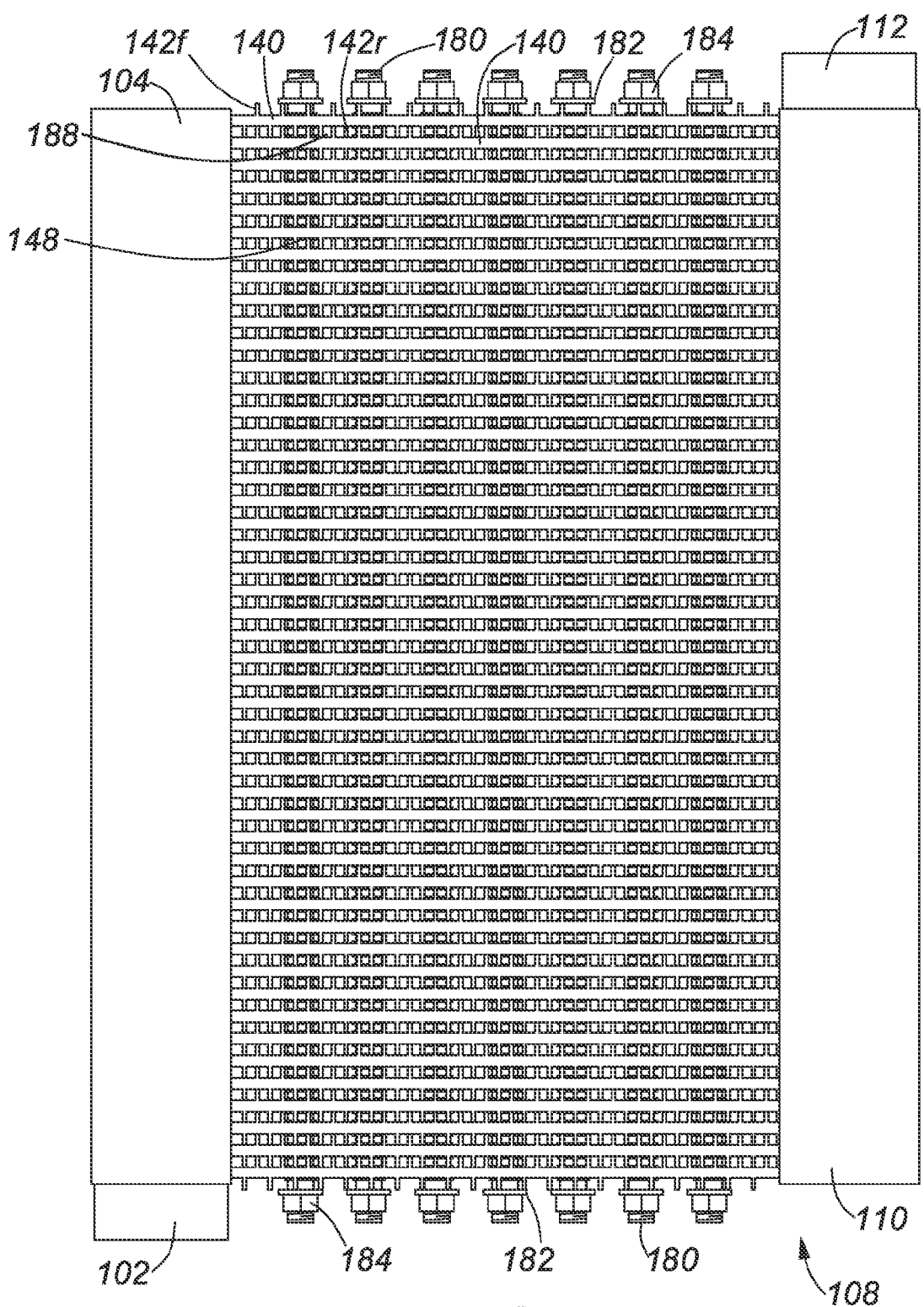
FIG. 9 is a side elevational view of the heat exchanger shown in FIG. 4, displayed in a vertical orientation to fit the page.

FIG. 9 is a side elevational view of the heat exchanger 108 shown in FIG. 4, displayed in a vertical orientation to fit the page. As explained above, a plurality of rods 180 have threaded ends that accept washers 182 and nuts 184. The nuts 184 are tightened to a predetermined torque to reinforce the heat exchanger unit 108. Testing has shown that with proper tension on rods 180, the heat exchanger unit 108 can contain fluid pressures of up to 4,000 psi. As will be understood by those skilled in the art, the rods 180 can be replaced with bolts if desired. As can be seen, the interleaved ribs 142$f$, 142$r$ of the respective heat recovery panels 140 form rectangular channels 188. The flue gas 30 (see FIG. 3) passes through the rectangular channels 188 and gives up sensible heat to the respective heat recovery panels 140. As the flue gas 30 cools, combustion water in the flue gas 30 condenses on the ribs 142f and 142r as well as all external surfaces of the respective heat recovery panels 140 because they are constantly cooled by fluid pumped through the heat exchanger 108. As the combustion water condenses, latent heat is given up to the heat recovery panels 140, which conduct the latent heat to the fluid being pumped through them.

Figure 10:
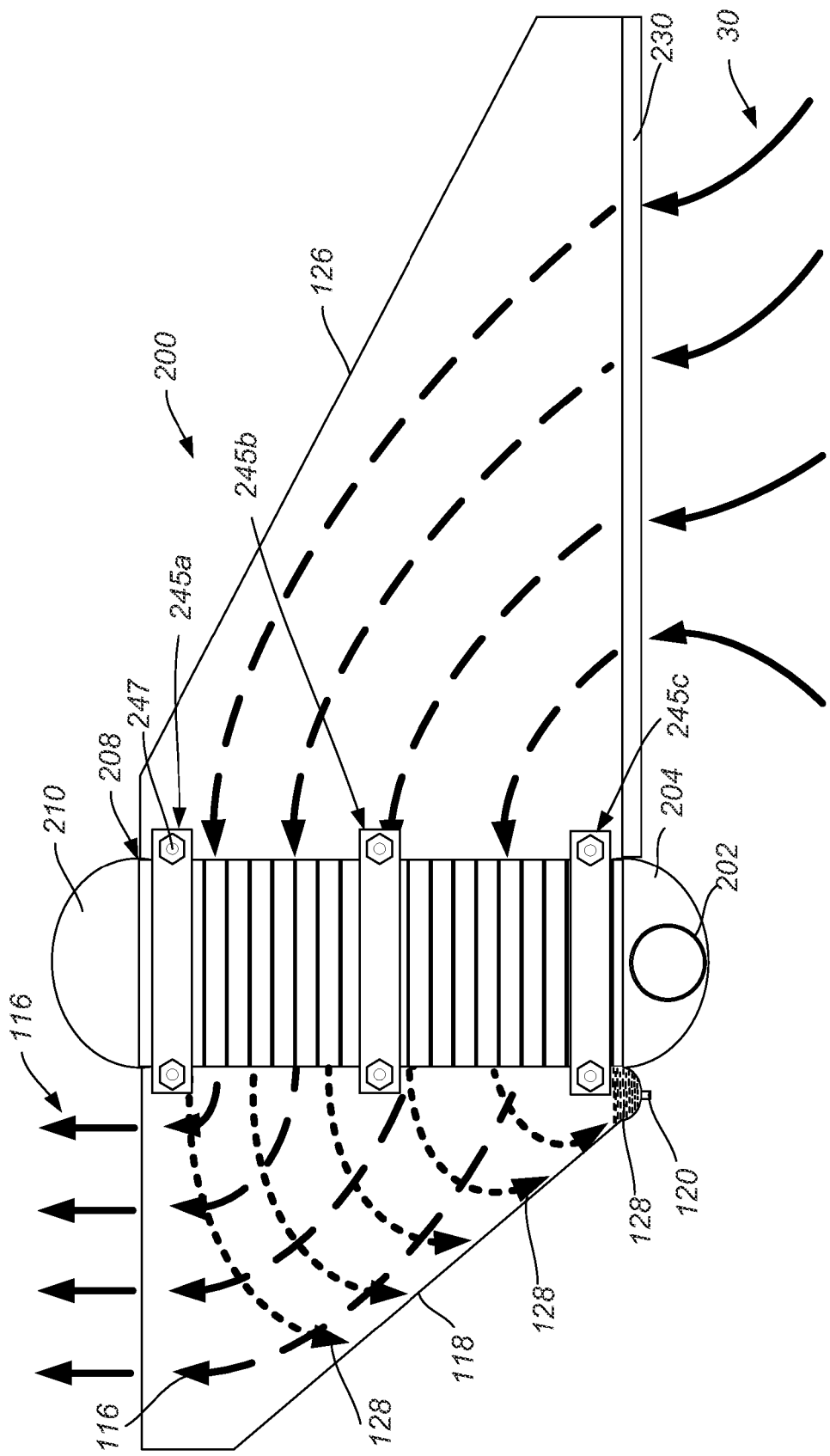
FIG. 10 is a schematic intake side view of another embodiment of the heat recovery unit shown in FIG. 2.

FIG. 10 is a schematic intake side view of another embodiment of the heat recovery unit shown in FIG. 2. In this embodiment, the heat recovery unit 200 is identical to the one described above with reference to FIG. 3 except that the heat recovery panels 240 (see FIG. 11) have no circular apertures and are clamped together by external clamp assemblies 245a-245c that are described below with reference to FIGS. 11 and 16. Connecting rods 247 of the external clamp assemblies 245a-245c pass through bores or notches (obstructed from view) in the condensate collector 118 and the exhaust intake hood 126. Gaskets or caulking are optionally used to provide a fluid tight seal between the connecting rods 247 and the respective condensate collector 118 and exhaust intake hood 126.

Figure 11:
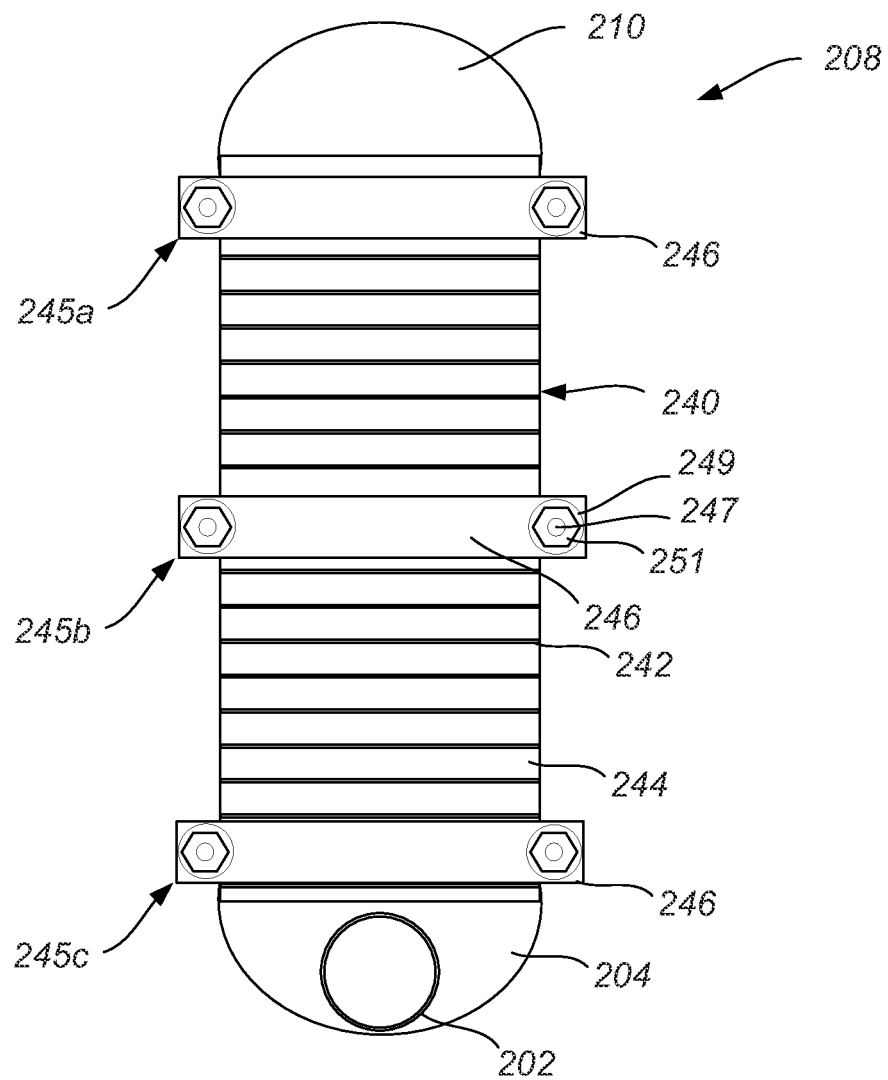
FIG. 11 is a schematic front elevational view of a heat exchanger of the heat recovery unit shown in FIG. 10.

FIG. 11 is a schematic front elevational view of the heat exchanger 208 of the heat recovery unit 200 shown in FIG. 10. As will be seen in FIG. 16, the heat exchanger 208 is assembled using a plurality of hollow rectangular heat recovery panels 240. In one embodiment, the respective heat recovery panels are fabricated from aluminum alloy plate, are identical in size and shape and each panel is about twice as long as it is wide. As will be seen in FIGS. 13 and 14, the opposite sides of each panel 240 have parallel ribs 242 that are perpendicular to side surfaces 244 of the respective panels 240. The heat recovery panels are clamped together by the three clamp assemblies 245a-245c. Each clamp assembly 245 includes two cross members 246, one on each end of the heat exchanger 208 as shown in FIG. 16; two elongated rods 247; four washers 249; and, four nuts 251. In one embodiment, the cross members 246 are I-beam shaped as can be seen in FIG. 16. The clamp assemblies 245a-245c reinforce the heat exchanger 208 to permit the heat exchanger 208 to contain fluid pressures of up to about 4,000 psi (about 27.5 mPa), which are at times present in frac fluid supply lines.

Figure 12:
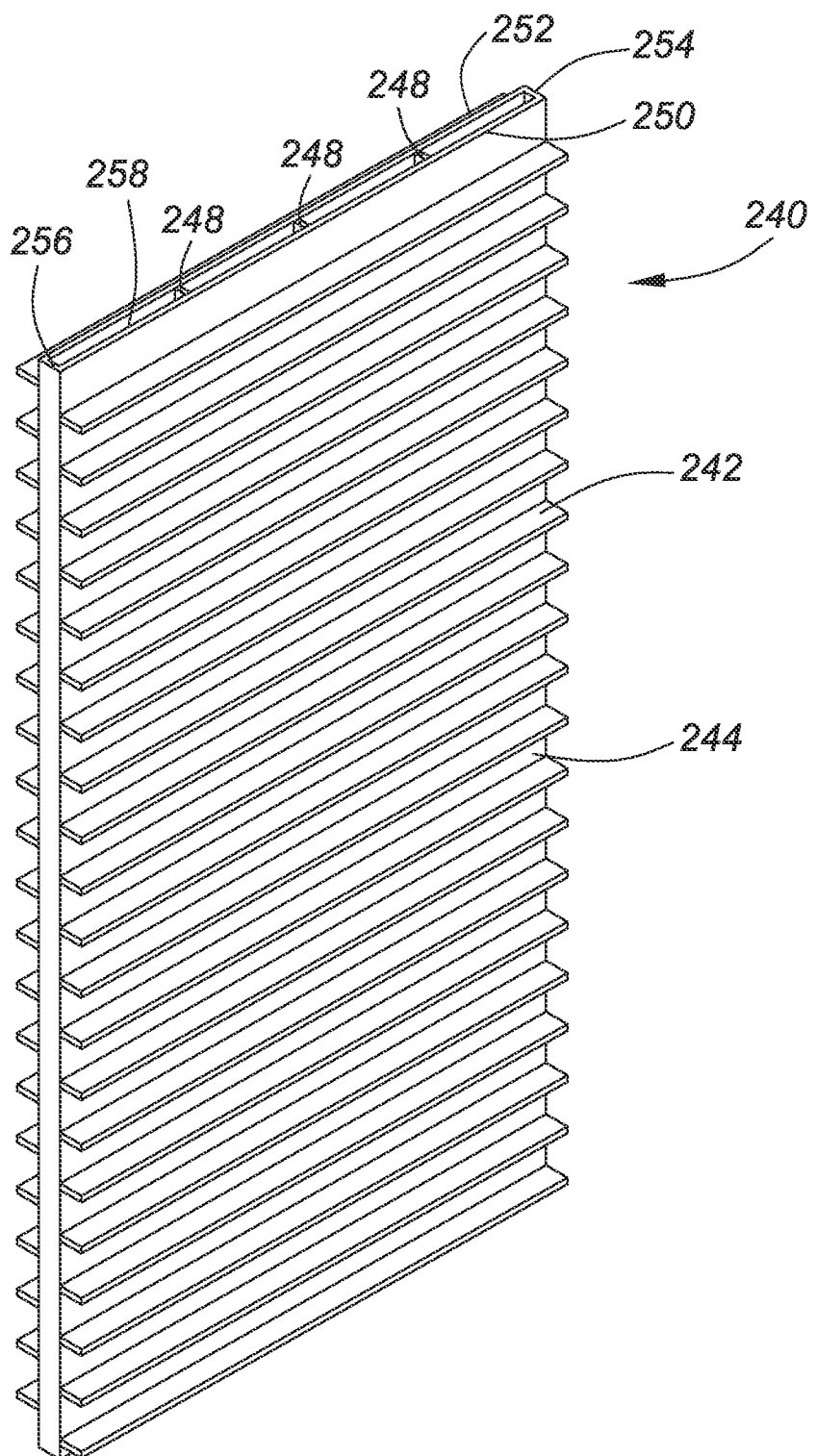
FIG. 12 is an isometric view of a heat recovery panel of the heat exchanger shown in FIG. 10.
Figure 14:
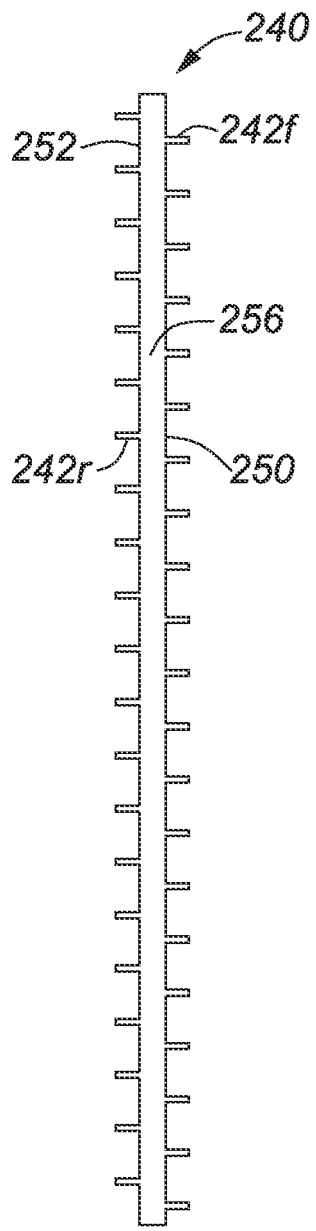
FIG. 14 is an edge view of the heat recovery panel shown in FIG. 12.

FIG. 12 is an isometric view of the heat recovery panel 240 of the heat exchanger 208 shown in FIG. 10. As can be seen, each panel 240 has opposed side walls, opposed edge walls and open top and bottom ends, and is constructed from four rectangular plates. The opposed side walls are constructed from plates that have a ribbed outer surface and a flat inner surface, while the opposed edge walls are constructed from plates that are flat on both sides. The four rectangular plates are referred to, for convenience only, as: ribbed front plate 250, ribbed rear plate 252, and flat edge plates 254 and 256. The four plates 250, 252, 254 and 256 collectively define a hollow rectangular channel 258 through which fluid flows from the intake manifold 202 to the outlet manifold 210 (see FIG. 11). The rectangular channel 258 is divided into four equal parts by three reinforcing bars 248 that extend a full length of each panel 240. The reinforcing bars 248 are welded to inside surfaces of the front panel 250 and the rear panel 252. The reinforcing bars 248 reinforce the panels 240 against fluid pressure and the compressive force applied by the clamp assemblies 245a-245c. The heat recovery panel 240 can be constructed in any convenient way, as described above with reference to FIG. 6. The ribs 242, which on the front plate 250 are alternate with respect to those on the rear plate 252 as seen in FIG. 14 (ribs 242f and 242r respectively), and are interleaved when the respective heat recovery panels 240 are assembled into the heat exchanger 208, as shown in FIG. 16. The ribs 242f and 242r support the respective heat recovery panels in a spaced-apart juxtaposition, as will also be explained below with reference to FIG. 16.

Figure 13:
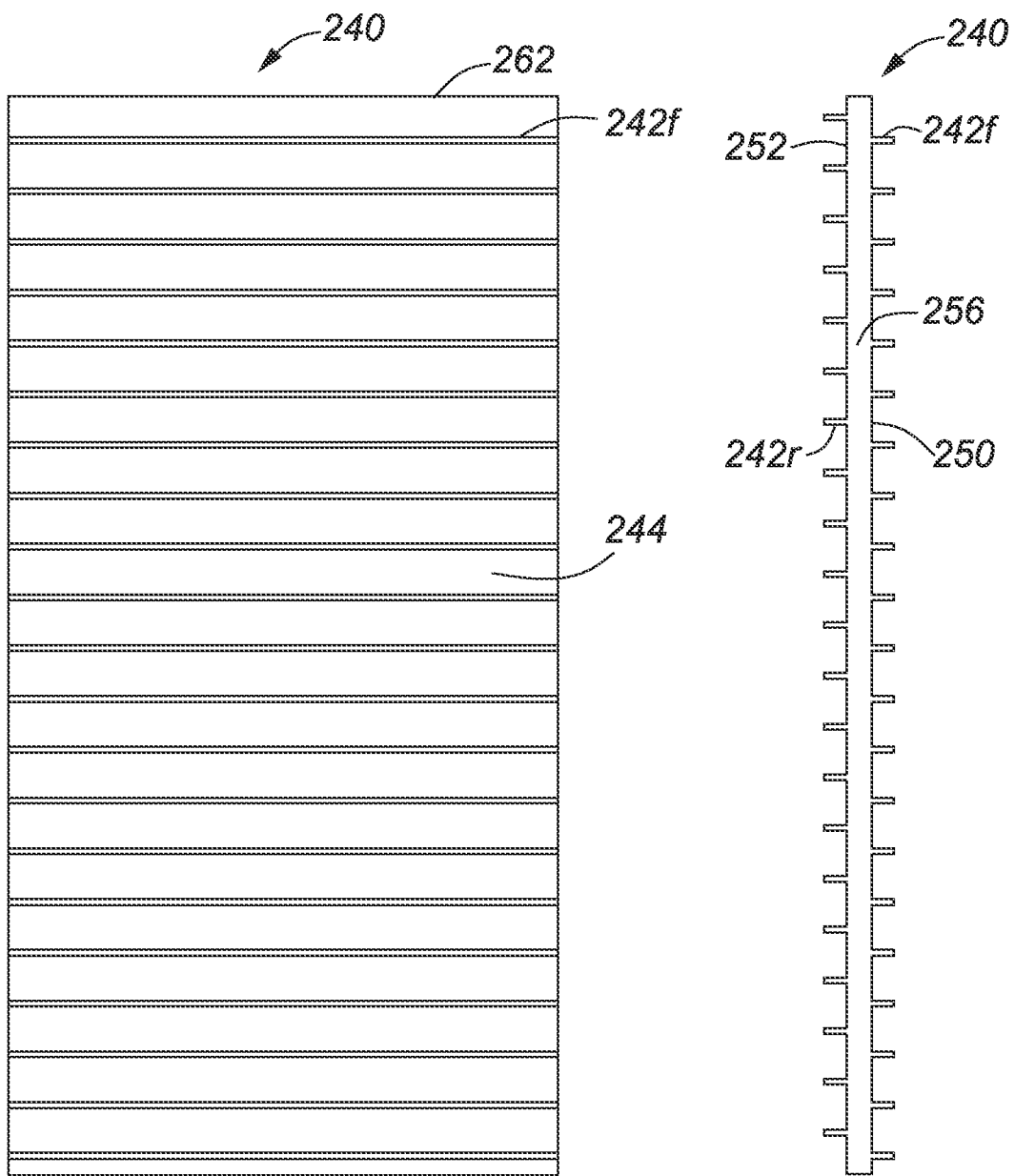
FIG. 13 is a side elevational view of the heat recovery panel shown in FIG. 12.

FIG. 13 is a side elevational view of the heat recovery panel shown in FIG. 12. The heat recovery panel 240 has a bottom end 260 connected to the intake manifold 204 and a top end 262 connected to the outlet manifold 210, as shown in FIG. 11.

FIG. 14 is an edge view of the heat recovery panel 240 shown in FIG. 12, showing edge plate 256. As explained above, the ribs 242f on the front plate 250 are alternate with respect to the ribs 242r on the rear plate 252.

Figure 15:
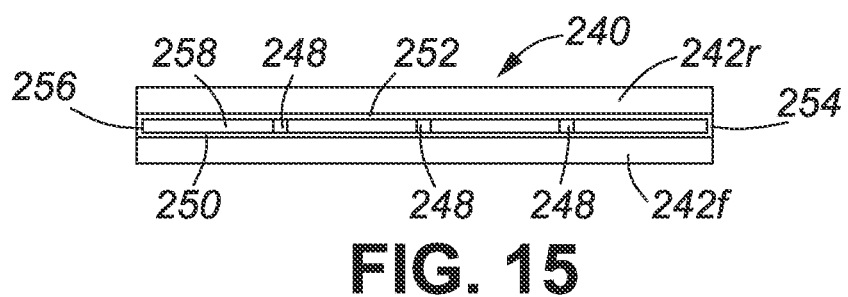
FIG. 15 is a top plan view of the heat recovery panel shown in FIG. 12.

FIG. 15 is a top plan view of the heat recovery panel 240 shown in FIG. 12. As explained above, the reinforcing bars 248 extend through the hollow channel 258 to reinforce the panel 240.

Figure 16:
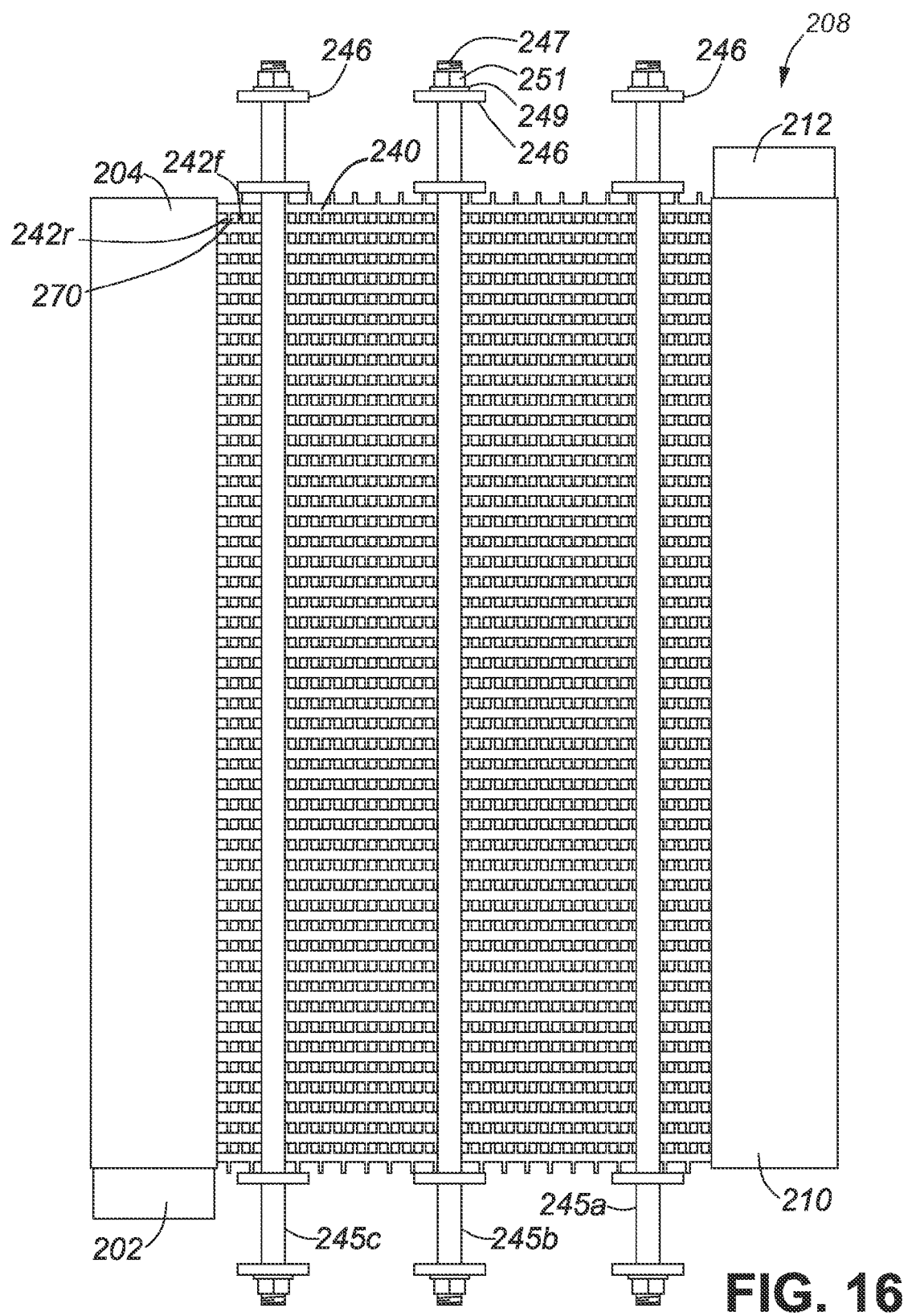
FIG. 16 is a side elevational view of the heat exchanger shown in FIG. 11, displayed in a vertical orientation to fit the page.

FIG. 16 is a side elevational view of the heat exchanger 208 shown in FIG. 11, displayed in a vertical orientation to fit the page. As explained above, the heat recovery panels 240 are clamped together by the three clamp assemblies 245a-245c. Each clamp assembly 245 includes two cross members 246, one on each end of the heat exchanger 208. The nuts 251 are tightened to a predetermined torque to reinforce the heat exchanger unit 208. Testing has shown that with proper tension on the elongated rods 247, the heat exchanger unit 208 can contain fluid pressures of up to 4,000 psi. As can be seen, the interleaved ribs 242f, 242r of the respective heat recovery panels 240 form rectangular channels 270. As explained above, the flue gas 30 (see FIG. 10) passes through the rectangular channels 270 and gives up sensible heat to the respective heat recovery panels 240. As the flue gas 30 cools, combustion water in the flue gas 30 condenses on the ribs 242f and 242r as well as all external surfaces of the respective heat recovery panels 240 because they are constantly cooled by fluid pumped through the heat exchanger 208. As the combustion water condenses, latent heat is given up to the heat recovery panels 240, which conduct the latent heat to the fluid being pumped through them.

Testing has shown that at least a 17% improvement in heat recovery from combusted fuel in realized with the heat recovery units 100, 200, which conserves fuel and reduces greenhouse gases discharged into the atmosphere.

The embodiments of the invention described above are intended to be exemplary only. The scope of the invention is intended to be limited solely by the scope of the appended claims.

I claim:

1. A condensing heat recovery unit for a portable fluid heater, comprising:
   a heat exchanger having an inlet manifold with an inlet port; an outlet manifold with an outlet port; and a plurality of rectangular heat recovery panels arranged in a side-to-side juxtaposition with open top ends respectively connected to the outlet manifold and the open bottom ends respectively connected to the inlet manifold;
   a flue gas collection hood that directs flue gas exhausted from the portable fluid heater into a first side of the heat exchanger;
   a condensate collector on an opposite side of the heat exchanger that funnels flue gas condensate to a condensate drain; and a high pressure fluid pump connected to the condensate drain to pump collected condensate to an inlet of the portable fluid heater.

2. The condensing heat recovery unit as claimed in claim 1 wherein the respective heat recovery panels have spaced-apart projecting ribs on respective opposed side walls.

3. The condensing heat recovery unit as claimed in claim 2 wherein the spaced-apart projecting ribs are parallel with the open top and bottom ends and the projecting ribs on the opposed side walls of the respective heat recovery panels are alternate.

4. The condensing heat recovery unit as claimed in claim 1 wherein the respective heat recovery panels further comprise a plurality of spaced-apart apertures that interconnect the respective side walls of each heat exchanger panel.

5. The condensing heat recovery unit as claimed in claim 4 further comprising a reinforcing rod inserted through respective sets of corresponding apertures in the respective juxtaposed heat recovery panels to clamp the respective heat recovery panels together.

6. The condensing heat recovery unit as claimed in claim 1 further comprising a plurality of spaced-apart clamping assemblies that clamp the respective heat recovery panels together.

7. The condensing heat recovery unit as claimed in claim 1 wherein the respective inlet and outlet manifolds are substantially semi cylindrical.

8. The condensing heat recovery unit as claimed in claim 6 wherein the inlet port is on an end of the inlet manifold and the outlet port is on an end of the outlet manifold, the end of the inlet manifold with the inlet port being on an opposite side of the heat exchanger from the end of the outlet manifold with the outlet port.

9. The condensing heat recovery unit as claimed in claim 1 wherein the inlet port is connected to a source of fluid to be heated and the outlet port is connected to an inlet port of the fluid heater.

10. A condensing heat recovery unit for a portable fluid heater, comprising:
- a heat exchanger with an inlet manifold having a fluid inlet port on one end; an outlet manifold having a fluid outlet port on an end opposite that of the inlet port; and a plurality of hollow rectangular heat recovery panels respectively having opposed side walls, opposed edge walls and open top and bottom ends, the respective heat recovery panels being arranged in a spaced-apart side-to-side juxtaposition with the open top ends respectively connected to the outlet manifold and the open bottom ends respectively connected to the inlet manifold, the respective heat recovery panels having parallel spaced-apart projecting ribs that are alternate on the respective opposed side walls and parallel with the open top and bottom ends so that the projecting ribs of juxtaposed heat recovery panels are interleaved and support the respective heat recovery panels in the spaced-apart juxtaposition;
- a flue gas collection hood that funnels flue gas exhausted from the portable fluid heater into a flue gas intake side of the heat exchanger; and
- a condensate collector connected to a flue gas outlet side of the heat exchanger to collect flue gas condensate expelled from the heat exchanger and funnel the condensate to a condensate drain.

11. The condensing heat recovery unit as claimed in claim 10 wherein the respective heat recovery panels further comprise a plurality of cylindrical apertures that extend through the respective side walls of each heat exchanger panel with reinforcing rods inserted through each set of cylindrical apertures to compress the respective heat recovery panels together so that the condensing heat recovery unit contains high internal fluid pressures.

12. The condensing heat recovery unit as claimed in claim 10 wherein the respective heat recovery panels further comprise a plurality of cylindrical passages that extend through the respective side walls of each heat recovery panel, the cylindrical passages permitting the insertion of reinforcing rods that bind the respective heat recovery panels together to permit the condensing heat recovery unit to contain high fluid pressures.

13. The condensing heat recovery unit as claimed in claim 10 further comprising a plurality of spaced-apart clamping assemblies that compress the respective heat recovery panels together to permit the condensing heat recovery unit to contain high fluid pressures.

14. A condensing heat recovery unit for a portable fluid heater, comprising:
- a heat exchanger having an inlet manifold with a fluid inlet port; an outlet manifold with a fluid outlet port; and a plurality of hollow rectangular heat recovery panels respectively arranged in a spaced-apart side-to-side juxtaposition with open top ends respectively connected to the outlet manifold and open bottom ends respectively connected to the inlet manifold, the plurality of hollow rectangular heat recovery panels respectively having parallel spaced-apart projecting ribs that are alternate on the respective opposed side walls and parallel with the open top and bottom ends so that the projecting ribs of juxtaposed heat recovery panels are interleaved and support the respective heat recovery panels in the spaced-apart juxtaposition;
- a flue gas collection hood that traps flue gas exhausted from the portable fluid heater and directs the flue gas into a first side of the heat exchanger; and
- a condensate collector connected to a second side opposite to the first side of the heat exchanger that collects flue gas condensate expelled from the heat exchanger and funnels the condensate to a condensate drain.

15. The condensing heat recovery unit as claimed in claim 14 further comprising a plurality of spaced-apart clamping assemblies that compress the respective heat recovery panels together to permit the condensing heat recovery unit to contain high fluid pressures.

16. The condensing heat recovery unit as claimed in claim 14 wherein the respective inlet and outlet manifolds are semi-cylindrical and the respective inlet and outlet ports are circular.

17. The condensing heat recovery unit as claimed in claim 14 wherein the inlet port is on one end of the inlet manifold and the outlet port is on one end of the outlet manifold, the end of the inlet manifold with the inlet port being on an opposite side of the heat exchanger from the end of the outlet manifold with the outlet port.

* * * * *